US008887646B2

(12) United States Patent
Skudutis et al.

(10) Patent No.: US 8,887,646 B2
(45) Date of Patent: Nov. 18, 2014

(54) SHIPPING PALLET POST REINFORCEMENT

(75) Inventors: Tommy J. Skudutis, King City (CA); Steven Grgac, Mississauga (CA)

(73) Assignee: Magna International Inc., Toronto (CA)

( * ) Notice: Subject to any disclaimer, the term of this patent is extended or adjusted under 35 U.S.C. 154(b) by 0 days.

(21) Appl. No.: 13/639,897

(22) PCT Filed: Apr. 7, 2011

(86) PCT No.: PCT/IB2011/001177
§ 371 (c)(1),
(2), (4) Date: Oct. 8, 2012

(87) PCT Pub. No.: WO2011/135453
PCT Pub. Date: Nov. 3, 2011

(65) Prior Publication Data
US 2013/0068143 A1   Mar. 21, 2013

Related U.S. Application Data

(60) Provisional application No. 61/342,044, filed on Apr. 8, 2010.

(51) Int. Cl.
*B65D 19/00* (2006.01)
*B32B 37/12* (2006.01)
*B65D 19/40* (2006.01)
*B29C 69/00* (2006.01)
*B29C 65/00* (2006.01)
*B65D 19/38* (2006.01)

(52) U.S. Cl.
CPC ............ *B65D 19/38* (2013.01); *B65D 19/0012* (2013.01); *B65D 2519/00069* (2013.01); *B65D 2519/00288* (2013.01); *B32B 37/12* (2013.01); *B65D 19/40* (2013.01); *B29C 69/00* (2013.01); *B65D 2519/00318* (2013.01); *B65D 2519/00348* (2013.01); *B29C 65/00* (2013.01); *B65D 2519/00104* (2013.01); *B65D 2519/00034* (2013.01); *B65D 2519/00273* (2013.01); *B65D 2519/0073* (2013.01); *B65D 2519/00562* (2013.01); *Y10S 108/901* (2013.01)
USPC .......................................... 108/56.3; 108/901

(58) Field of Classification Search
USPC .............. 206/386, 599; 108/901, 56.3, 57.31, 108/57.33, 57.34, 56.1, 57.25, 57.29
See application file for complete search history.

(56) References Cited

U.S. PATENT DOCUMENTS 2,991,965 A * 7/1961 Drieborg ..................... 108/57.31
3,393,647 A * 7/1968 Howell ........................ 108/57.31

(Continued)

FOREIGN PATENT DOCUMENTS

WO   2009099314 A1   8/2009

OTHER PUBLICATIONS

International Search Report and Written Opinion for International Patent Application PCT/IB2011/001177 Filed Apr. 7, 2011.

*Primary Examiner* — Janet M Wilkens
(74) *Attorney, Agent, or Firm* — Warn Partners, P.C.

(57) ABSTRACT

A pallet used for stowing and transporting items for shipping. The pallet design of the present invention includes a top deck, a bottom skid, and several posts for providing support between the top deck and bottom skid. The posts are integrated with either the top deck or bottom skid. Within each pallet post is a steel tube reinforcement that is overmolded directly into the bottom skid, or is assembled after the pallet post is molded. The supports, which are typically hollow posts, are molded onto either the top deck or bottom skid, and a thermoplastic weld or adhesive joint is applied to the posts to complete the assembly. The palled having the integrated posts and reinforcements provides an economical approach of reinforcing pallet posts to absorb tow fork impact.

22 Claims, 2 Drawing Sheets

(56) References Cited

U.S. PATENT DOCUMENTS

| | | | |
|---|---|---|---|
| 3,407,758 A * | 10/1968 | Simkins | 108/51.3 |
| 3,438,342 A * | 4/1969 | Woolworth et al. | 108/56.3 |
| 3,610,173 A * | 10/1971 | McIlwraith et al. | 108/56.1 |
| 3,664,271 A * | 5/1972 | Wolder et al. | 108/57.26 |
| 3,680,496 A * | 8/1972 | Westlake, Jr. | 108/57.26 |
| 3,699,902 A * | 10/1972 | Allgeyer et al. | 108/57.26 |
| 4,013,021 A | 3/1977 | Steinlein et al. | |
| 4,118,855 A * | 10/1978 | Lequeux | 29/447 |
| 5,298,098 A * | 3/1994 | Hoedl | 156/73.1 |
| 5,351,628 A * | 10/1994 | Breezer et al. | 108/56.1 |
| 5,382,214 A * | 1/1995 | Mano | 493/89 |
| 5,590,691 A * | 1/1997 | Iorio et al. | 138/146 |
| 5,672,412 A * | 9/1997 | Phares et al. | 428/182 |
| 6,021,721 A * | 2/2000 | Rushton | 108/56.3 |
| 6,173,657 B1* | 1/2001 | Espejo | 108/51.11 |
| 6,503,585 B1* | 1/2003 | Wagenblast et al. | 428/34.1 |
| 6,676,790 B1* | 1/2004 | Valentinsson et al. | 156/182 |
| D584,874 S * | 1/2009 | Sasnowski | D34/38 |
| D647,685 S * | 10/2011 | Atkins | D34/38 |
| 2007/0256609 A1 | 11/2007 | Naidu et al. | |
| 2009/0095205 A1* | 4/2009 | Morris | 108/57.17 |
| 2009/0241461 A1* | 10/2009 | Linares | 52/592.1 |
| 2011/0259248 A1* | 10/2011 | Grgac et al. | 108/57.33 |

* cited by examiner

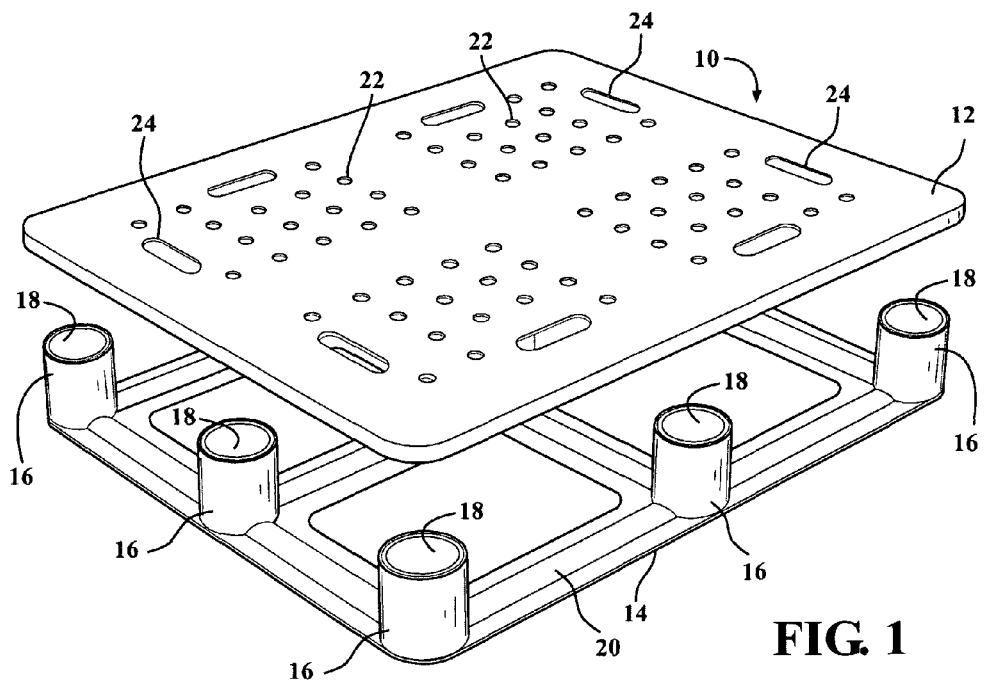
FIG. 1
FIG. 2
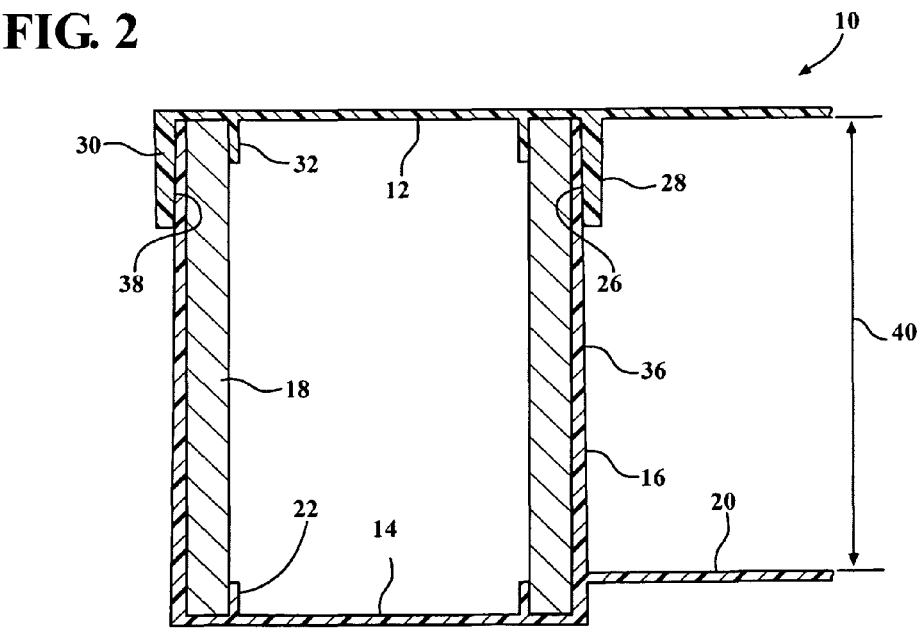

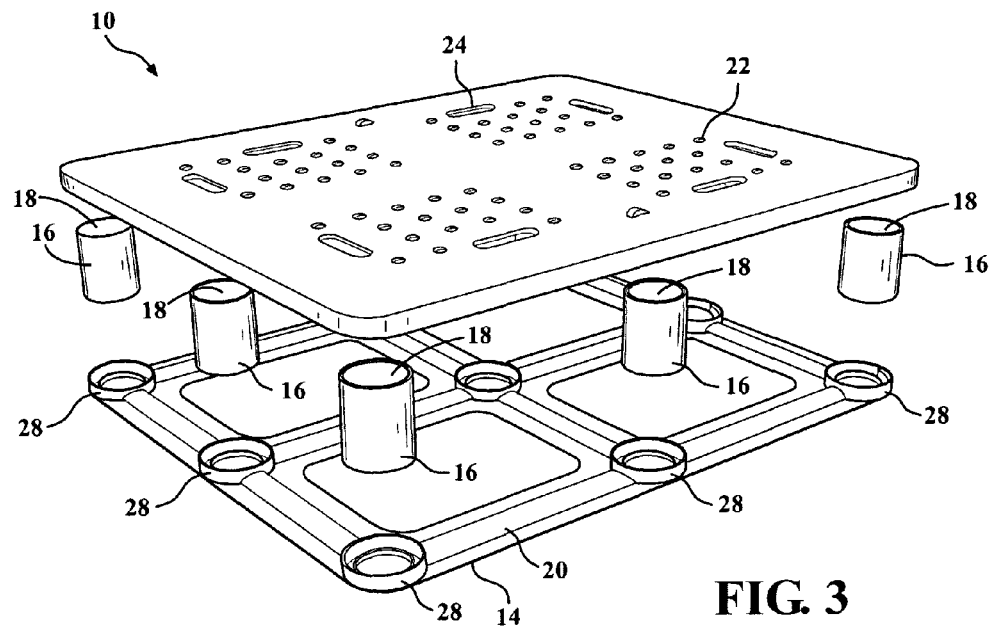
FIG. 3
FIG. 4
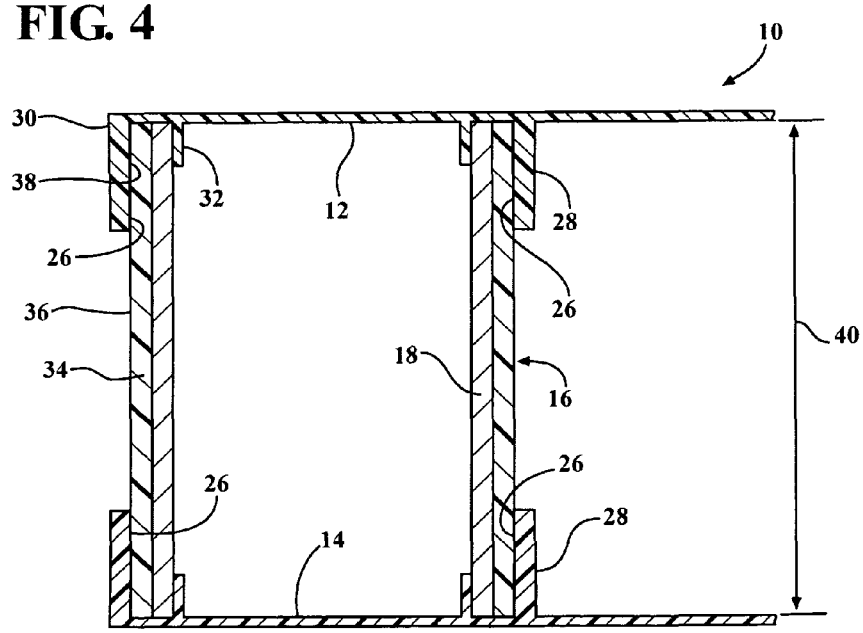

SHIPPING PALLET POST REINFORCEMENT

CROSS-REFERENCE TO RELATED APPLICATIONS

This application is a National Stage of International Application No. PCT/IB2011/001177, filed Apr. 7, 2011. This application claims priority to U.S. Provisional Application No. 61/342,044 filed on Apr. 8, 2010. The disclosure of the above application is incorporated herein by reference.

FIELD OF THE INVENTION

The present invention relates to a pallet made of a plastic material which meets various tow fork impact requirements.

BACKGROUND OF THE INVENTION

Pallets are a common device used for stowing and transporting items during shipping. Pallets typically consist of a top deck, a bottom skid, and several supports, or posts, positioned in between such that there is space between the top deck and bottom skid. The space allows for the tow forks of a fork lift truck to be positioned in between the top deck and bottom skid such that the pallet, and hence anything stowed on the pallet, is able to be lifted and moved from one place to another. This is especially useful when items are being loaded and unloaded during shipping.

In the past, pallets were generally made of wood, but there has been an increasing interest in making pallets out of plastic materials to increase the durability of the pallets. However, pallets must possess certain strength requirements. More specifically, the supports must be able to withstand the impact from the forks of the fork lift or other vehicle used for moving the pallets, as well as support the load placed on the pallet. Pallets are commonly exposed to impact from the tow forks from a fork lift because they are moved so frequently, and used for transporting various items on essentially a daily basis.

Attempts to make pallets out of plastic composite materials have proven to be unsuccessful. One of the reasons for this is that in order for the posts to posses the proper amount of strength to resist impact from tow forks, the posts must have a certain thickness, and have been manufactured with a thickness of nine millimeters to possess the proper strength. However, for typical injection molding cycle times, the wall stock thicknesses of the posts should be between three and six millimeters. Posts with the typical wall thickness of three to six millimeters, which are common injection molding wall thicknesses, cannot absorb impact from tow forks; the fork will penetrate the post upon impact. Conversely, plastic material having a thickness of nine millimeters requires longer molding cycle times, which is considered undesirable and uneconomical.

Another approach to solving this problem is to use high-density polyethylene (HDPE), which has the ability to stretch under load applied from tow forks with integrated steel roll reinforcements, such as steel roll formed sections or pipes to carry loads which are contained within a welded HDPE assembly. Using this design is often considered undesirable because it is so costly.

Accordingly, there exists a need for an improved manufacturing method for making pallets out of a composite material having posts which possess the desired strength to resist the impact of a tow fork, while at the same time are economical to manufacture.

SUMMARY OF THE INVENTION

The present invention is a pallet used for stowing and transporting items for shipping. The pallet design of the present invention includes a top deck, a bottom skid, and several posts for providing support between the top deck and bottom skid. The posts are integrated with either the top deck or bottom skid.

In one embodiment of the invention, within each pallet post is a steel tube reinforcement that is overmolded directly into the bottom skid, or is assembled after the pallet post is molded. The present invention includes molding the supports, which are typically hollow posts, onto either the top deck or bottom skid, and applying a thermoplastic weld or adhesive joint to the posts to complete the assembly.

In another embodiment, the top deck and bottom skid both have collars designed to receive steel tubes with protective coatings of non-filled thermoplastic material on the outer surface of the steel tube. The coating also provides a welding surface near the top and bottom of the tube suitable for various welding processes, such as thermoplastic welding. The thermoplastic material is applied to the steel pipe in one of several ways. In one embodiment, the thermoplastic material is injection molded and slid onto the steel pipe. In another embodiment, the thermoplastic material is extruded and cut as a pipe section and slid over the steel pipe. Another embodiment includes extruding the thermoplastic material directly onto the steel pipe. Another embodiment includes applying the thermoplastic material adhesively using a film.

One object of this invention is to develop an economical approach of reinforcing pallet posts to absorb tow fork impact.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is an exploded perspective view of a pallet, according to a first embodiment of the present invention;

FIG. 2 is a sectional side view of a support used for a pallet, according to a first embodiment of the present invention;

FIG. 3 is an exploded perspective view of a pallet, according to a second embodiment of the present invention; and FIG. 4 is a sectional side view of a support used for a pallet, according to a second embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

A first embodiment of a pallet according to the present invention is shown in FIGS. 1 and 2 generally at 10. The pallet 10 includes a top deck 12, a bottom skid 14, and a plurality of supports, or in this embodiment, posts 16. Disposed within the posts 16 are reinforcements 18. In this embodiment, the posts 16 are integrated or molded with the bottom skid 14, but it is within the scope of the invention that the posts 16 may be integrated with the top deck 12 as well.

During the manufacturing process, the top deck 12 and bottom skid 14 are formed using an injection molding process. There is a ridge, or raised portion 20 used for providing added strength to the bottom skid 14 that is formed during the injection molding process. Additionally, there are various apertures 22 and slots 24 which are used for attaching items to the top deck 12, as well as allowing sprinkler water to drain through a stack of pallets 10 in case of a fire in a warehouse full of pallets 10.

In one embodiment, once the top deck 12, bottom skid 14, and posts 16 are formed, then the reinforcements 18 are inserted into the posts 16 as shown in FIG. 2. The top deck 12 is then assembled to the posts 16, and a connection point such as a thermoplastic weld or adhesive 26 is applied to each post 16, securing the top deck 12 to the posts 16. In this embodiment, the top deck 12 has a plurality of collars 28 which receive the posts 16 and reinforcements 18. The collars 28 include an outer wall 30 and an inner wall 32. The thermoplastic weld or adhesive 26 is applied to the outer surface 36 of each post 16 and the inner surface 38 of the outer wall 30. Once the top deck 12 is secured to the posts 16, the pallet 10 is assembled. Because the reinforcements 18 are used, the posts 16 are able to be molded using conventional wall stock thickness, resulting in no cycle time penalties.

In another embodiment, the reinforcements 18 are overmolded directly into the bottom skid 14 prior to assembly to the top deck 12.

Once assembled, the posts 16 provide the proper amount of spacing 40 between the top deck 12 and the bottom skid 14 to allow the tow forks of a fork lift (not shown) to be placed in between the deck 12 and skid 14, allowing the pallet 10 to be moved from one location to another. The reinforcements 18 are a steel tube having the required strength to withstand the impact of a tow fork.

Another embodiment of a pallet according to the present invention is shown in FIGS. 3 and 4, where like numbers refer to like elements. In this embodiment, the posts 16 are separate components from both the top deck 12 and the bottom skid 14, and both the top deck 12 and bottom skid 14 have collars 28 designed to receive the posts 16. In this embodiment, the posts 16 are the steel tube reinforcements 18 having a protective coating 34 of non-filled thermoplastic material on the outer surface of the reinforcement 18. Once the posts 16 are disposed in the collars 28, a thermoplastic weld 26 or adhesive joint is applied to secure the posts 16 to the top deck 12 and bottom skid 14.

In the embodiment shown in FIGS. 3 and 4, the protective thermoplastic coating 34 is applied to the steel tube reinforcement in one of several ways. One embodiment is that the thermoplastic coating 34 is injection molded and slid onto the steel pipe reinforcement 18. In another embodiment, the thermoplastic material used for the coating 34 is extruded and cut as a pipe section and slid over the reinforcement 18.

Another embodiment includes extruding the thermoplastic coating 34 as a long, cylindrical coating extruded over a long, cylindrical steel tube. The coating and tube are cut into sections to form each reinforcement 18. In yet another embodiment, the thermoplastic coating 34 is applied to the reinforcement 18 adhesively using a film.

The description of the invention is merely exemplary in nature and, thus, variations that do not depart from the essence of the invention are intended to be within the scope of the invention. Such variations are not to be regarded as a departure from the spirit and scope of the invention.

We claim:

1. A shipping pallet, comprising:
    a top deck;
    a bottom skid;
    a plurality of posts connected to said top deck and said bottom skid such that said top deck is positioned at a distance from said bottom skid, where said plurality of posts are tubular;
    a plurality of reinforcements, each one of said plurality of reinforcements disposed within a respective one of said plurality of posts such that said plurality of reinforcements increases the strength of each of said plurality of posts;
    a plurality of collars, a portion of said plurality of collars are integrally formed with said top deck, and a portion of said plurality of collars are integrally formed with said bottom skid, where said plurality of collars are circular; and
    a plurality of raided ridges formed between said plurality of collars and integrally formed with said bottom skid for providing strength to said bottom skid, where each end of said plurality of raised ridges terminates at each of said plurality of collars.

2. The shipping pallet of claim 1, each of said plurality of collars further comprising:
    an inner wall; and
    an outer wall, said outer wall being longer than said inner wall such that at least a portion of one of said plurality of posts is located between said inner wall and said outer wall.

3. The shipping pallet of claim 2, wherein a connection point is applied to an outer surface of one of said plurality of posts and an inner surface of said outer wall.

4. The shipping pallet of claim 3, wherein said connection point is one selected from the group consisting of a thermoplastic weld and an adhesive.

5. The shipping pallet of claim 1, each of said plurality of reinforcements further comprising a plurality of steel tubes.

6. The shipping pallet of claim 5, wherein each of said plurality of posts is overmolded onto a respective one of said steel tubes forming a protective coating.

7. The shipping pallet of claim 5, wherein each of said plurality of posts is injection molded to form a protective coating and each one of said plurality of steel tubes is slid into a respective one of said plurality of posts where said protective coating is on the outer surface of said plurality of steel tubes.

8. The shipping pallet of claim 5, wherein each of said plurality of posts is extruded from a cylindrical coating and cut into sections to form each of said plurality of posts, and each one of said plurality of steel tubes is slid into a respective one of said plurality of posts to form a protective coating on the outer surface of each one of said plurality of steel tubes.

9. The shipping pallet of claim 5, wherein said plurality of steel tubes are created as one cylindrical tube, and each of said plurality of posts is formed by extruding a thermoplastic coating over said cylindrical tube, and cutting said cylindrical tube into sections to form a protective coating on the outer surface of each one of said plurality of steel tubes.

10. The shipping pallet of claim 5, wherein each of said plurality of posts is applied to a respective one of said plurality of steel tubes using a film to form a protective coating.

11. A method of reinforcing a post of a shipping pallet, comprising the steps of:
    providing a top deck;
    providing a bottom skid;
    providing a plurality of posts that are tubular;

providing a plurality of reinforcements;
positioning each of said plurality of reinforcements within a respective one of said plurality of posts;
providing a plurality of collars that are circular;
providing a plurality of connection points;
providing a plurality of raised ridges formed between said plurality of collars and integrally formed with said bottom skid for providing strength to said bottom skid, where each end of said plurality of raided ridges terminates at each of said plurality of collars.
integrally forming a portion of said plurality of collars with said top deck;
integrally forming a portion of said plurality of collars with said bottom skid;
inserting at least a portion of one of said plurality of posts in to a respective one of said plurality of collars formed as part of said top deck, and connecting said at least a portion of one of said plurality of posts to said one of said plurality of collars formed as part of said top deck with one of said plurality of connection points; and
inserting at least a portion of one of said plurality of posts into a respective one of said plurality of collars formed as part of said bottom skid, and connecting said at least a portion of one of said plurality of posts to said one of said plurality of collars formed as part of said bottom skid with one of said plurality of connection points; and
connecting each of said plurality of posts with said top deck and said bottom skid such that said top deck is positioned relative to said bottom skid to provide a spacing between said top deck and said bottom skid.

12. The method for reinforcing a post of a shipping pallet of claim 11, further comprising the steps of said connection point being one selected from the group consisting of an adhesive and a thermoplastic weld.

13. The method for reinforcing a post of a shipping pallet of claim 11, further comprising the steps of:
providing an inner wall formed as part of said collar;
providing an outer wall formed as part of said collar, said outer wall being longer in relation to said inner wall; and
placing each of said plurality of posts in connection with a respective one of said plurality of collars such that one of said plurality of posts is at least partially disposed between said inner wall and said outer wall.

14. The method for reinforcing a post of a shipping pallet of claim 11, further comprising the steps of providing said plurality of reinforcements to be comprised of a plurality of steel tubes.

15. The method for reinforcing a post of a shipping pallet of claim 14, further comprising the steps of cover molding each of said plurality of posts onto a respective one of said plurality of steel tubes.

16. The method for reinforcing a post of a shipping pallet of claim 14, further comprising the steps of:
injection molding each of said plurality of posts; and
sliding one of said plurality of steel tubes into a respective one of said plurality of posts.

17. The method of reinforcing a post of a shipping pallet of claim 14, further comprising the steps of:
extruding a thermoplastic coating;
cutting said thermoplastic coating into sections to form each of said plurality of posts; and
sliding one of said plurality of steel tubes into a respective one of said plurality of posts.

18. The method for reinforcing a post of a shipping pallet of claim 14, further comprising the steps of:
providing a cylindrical tube used for forming said plurality of steel tubes
providing a thermoplastic coating used for forming said plurality of posts;
extruding said thermoplastic coating onto said cylindrical steel tube; and
cutting said cylindrical tube into sections to form said plurality of reinforcements disposed in said plurality of posts.

19. A shipping pallet having a reinforcement, comprising:
a top deck;
a bottom skid;
a plurality of posts formed as part of one of said top deck or said bottom skid, where said plurality of posts are tubular;
a plurality of reinforcements, each of said plurality of reinforcements disposed within a respective one of said plurality of posts;
a plurality of connection points, one of said plurality of connection points connecting one of said plurality of posts to one or more of said plurality of collars; and
a plurality of collars having an inner wall and an outer wall that are circular and have concentricity, a portion of said plurality of collars integrally formed as part of said top deck and a portion of said plurality of collars integrally formed as part of said bottom skid such that when said plurality of posts are connected to one or more of said plurality of collars, positioning said top deck to said bottom skid to provide a spacing between said top deck and said bottom skid and
a plurality of raised ridges formed between said plurality of collars and integrally formed with said bottom skid for providing strength to said bottom skid, where each end of said plurality of raided ridges terminates at each of said plurality of collars.

20. The shipping pallet having a reinforcement of claim 19, wherein each of said outer wall is longer than said inner wall such that at least a portion of one of said plurality of posts is located between said inner wall and said outer wall.

21. The shipping pallet having reinforcement of claim 19, each of said plurality of connection points further comprising one selected from the group consisting of an adhesive and a thermoplastic weld.

22. The shipping pallet having a reinforcement of claim 19, each of said plurality of reinforcements further comprising a steel tube, and each of said plurality of posts further comprising a non-filled thermoplastic material.

* * * * *